United States Patent [19]
Friedman et al.

[11] 3,749,905
[45] July 31, 1973

[54] RECHARGEABLE FLASHLIGHT AND SUPPORT STAND THEREFOR

[76] Inventors: Abraham Friedman; Aaron Friedman, both of 2444 Forest Green Rd., Baltimore, Md. 21209

[22] Filed: Sept. 22, 1972

[21] Appl. No.: 291,518

[52] U.S. Cl.... 240/10.6 CH, 240/6.4 R, 240/10.66, 320/3, 320/25
[51] Int. Cl............................. F21l 7/00, H02j 7/00
[58] Field of Search ................... 240/6.4 R, 10.6 R, 240/10.6 CH, 10.65, 10.66; 320/3, 25

[56] References Cited
UNITED STATES PATENTS

| | | | |
|---|---|---|---|
| 3,521,050 | 7/1970 | Shagena, Jr. | 240/10.66 |
| 2,236,338 | 2/1941 | Emanuel | 240/10.6 CH |
| 2,293,284 | 8/1942 | Emanuel | 240/10.6 CH |
| 3,644,873 | 2/1972 | Dalton et al. | 320/25 X |
| 3,659,180 | 4/1972 | Urbush | 320/25 X |
| 3,217,224 | 11/1965 | Sherwood | 240/10.6 CH |
| 3,261,973 | 7/1966 | Kott | 240/10.66 |

FOREIGN PATENTS OR APPLICATIONS

| | | | |
|---|---|---|---|
| 229,736 | 2/1944 | Switzerland | 240/10.6 CH |

Primary Examiner—Joseph F. Peters, Jr.
Attorney—William D. Hall et al.

[57] ABSTRACT

A portable flashlight having rechargeable batteries and a support stand for attachment to a motor vehicle is provided. The flashlight defines a pair of contact electrodes mounted on the exterior of the flashlight casing which engage the stand and provide support for the flashlight and electrical contact for recharging the flashlight. An impedence means is provided to match the voltage of the motor vehicle battery to the voltage of the rechargeable battery and a light emitting diode is used to indicate the flow of current to said rechargeable battery. It is preferred to provide means to protect the rechargeable battery from reverse charging.

10 Claims, 5 Drawing Figures

PATENTED JUL 31 1973 3,749,905

3,749,905

RECHARGEABLE FLASHLIGHT AND SUPPORT STAND THEREFOR

BACKGROUND OF THE INVENTION

The present invention is related to the field of rechargeable flashlights, and in particular to rechargeable flashlights which are adapted to be mounted within a motor vehicle.

The invention also relates to flashlights and rechargeable batteries in which the entire recharging circuit is self-contained within the charging stand or within the flashlight itself wherein the batteries for the flashlight may be recharged without removing them or in any way disassembling the flashlight.

Emergency flashlights and other flashlights intended for use in the repair of an automobile are often stored in the trunk or glove compartment of the automobile for long periods of time. Due to the temperatures which are reached when a vehicle is parked in the hot sun, and the length of time between each use of the flashlight, it is a common occurrence to find the emergency flashlight with only a partial charge on its batteries or to find the flashlight batteries completely dead.

Accordingly, various rechargeable flashlights and flashlight battery charging apparatus which provide for the automatic recharging of a flashlight having batteries contained therein have been suggested. Examples of this type of device are U.S. Pat. No. 2,588,962, issued to T. Carlson on Mar. 11, 1952; U.S. Pat. No. 3,217,224, issued to G. W. Sherwood on Nov. 9, 1965; and U.S. Pat. No. 3,521,050, issued to J. L. Shagena, Jr. on July 21, 1970. However, these prior devices have not received widespread commercial acceptance because of one defect or another.

It is therefore an object of the present invention to provide a rechargeable flashlight which will be recharged from the primary battery of the motor vehicle during periods of non-use of the flashlight regardless of whether the motor vehicle ignition is off or on. It is an object of the present invention to provide a portable flashlight for use in a motor vehicle together with a support stand to charge and hold the flashlight in place during periods of non-use of the flashlight.

It is a further object of the present invention to provide a portable flashlight for use in a motor vehicle together with a support stand which also acts as a charging stand thereby providing a continuous electrical charge to the rechargeable battery to maintain the battery at its full life expectancy. It is another object of the present invention to provide a support stand for a battery which will securely maintain a flashlight in place and insure a continuous electrical connection between the charging stand and the battery.

Accordingly, the present invention makes it possible to provide a flashlight which will always be fully charged and readily available for use in the event of an emergency or for use by firemen, policemen, or other persons involved in emergency situations.

It is another object of the present invention to provide a recharging circuit with an impedence means to match the voltage of the automobile or other vehicle's electrical system with the voltage of the rechargeable battery contained in the flashlight. The recharging circuit also contains a light emitting diode. The recharging circuit of the present invention insures against overcharging of the rechargeable batteries in the flashlight. In addition, the present invention makes it possible to recharge a flashlight from the primary battery of a motor vehicle whether the ignition of the vehicle is off or on without causing any noticeable damage to the battery.

SUMMARY OF THE INVENTION

The present invention is concerned with a portable flashlight having rechargeable battery and a support stand for attachment to a motor vehicle comprising:

a. a portable flashlight having a casing, at least one rechargeable battery, a lamp socket and lamp means for providing light, reflector means, switch means for connecting the lamp and socket to the battery, and a first pair of contact electrodes mounted on the exterior of the casing, the electrodes protruding outwardly on opposite sides of the casing and rigidly attached thereto;

b. a support stand for mounting on a stable wall means, said stand providing a second pair of contact electrodes for supporting the flashlight and engaging the first pair of contact electrodes;

c. means for providing a source of DC voltage to the second pair of contact electrodes; and d. charging means for charging said rechargeable battery, the charging means match said rechargeable battery to the DC voltage provided for recharging and comprise a first impedence means, a second impedence means connected in parallel with the first impedence means, and a light emitting diode, the light emitting diode to indicate that said rechargeable battery is being recharged.

DESCRIPTION OF THE PREFERRED EMBODIMENTS

Figure 1:
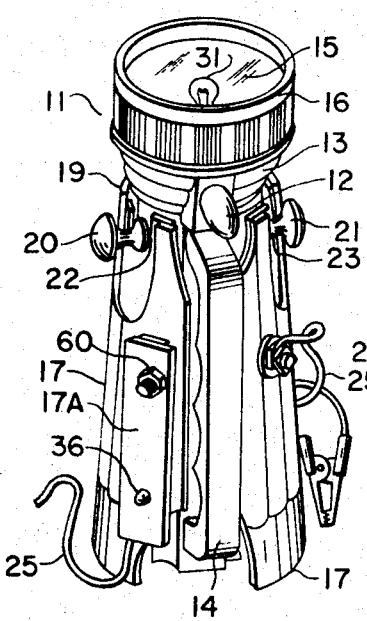
FIG. 1 is an isometric view of a portable flashlight and support stand constructed in accordance with the present invention.

FIG. 1 is an isometric illustration of a portable flashlight and support stand of the present invention. The flashlight 11 is equipped with a switch means 12, a casing 13, a handle portion 14, a reflector 15 and an enlarged portion of the casing 16 which surrounds and provides support for the reflector 15.

The support stand 17 is provided with means (not shown), such as a nut and bolt located in the rear of the stand, for attaching the stand to a wall or vehicle bulkhead. Extending outwardly from the casing 13 are a pair of contact electrodes 20 and 21 which fit into slots 22 and 23 defined by the stand 17. The contact electrodes are on opposite sides of the casing and preferably are substantially horizontal. The outwardly extending pins 20 and 21 have metallic electrical connectors mounted thereon, and the slots 22 and 23 defined at least within a portion of their periphery a metallic connector adapted to make an electrical connection with the pins 20 and 21. In one embodiment of the invention, the pins 20 and 21 are solid metal, and the inner surfaces of slots 22 and 23 are lined with a metallic member to contact and support the pins 20 and 21 and are generally U-shaped. Moreover, it may be desirable to provide the support stand with an upper portion 19 that is so configured that it intimately engages the enlarged portion 16 of casing 13 and provides a support therefor. Secured to the side or rear portion of the holder 17 by means 60 is a cover plate 17A for protecting a recharging circuit attached to the holder 17. The housing 17A is provided with an orifice to accommodate the light emitting diode 36 so that the light emitting diode is readily visible from the exterior of the cover 17A. Substantially the entire support means including the cover plate except for the contact electrode portions is preferably composed of a non-conductor of electricity such as a synthetic plastic.

Figure 2:
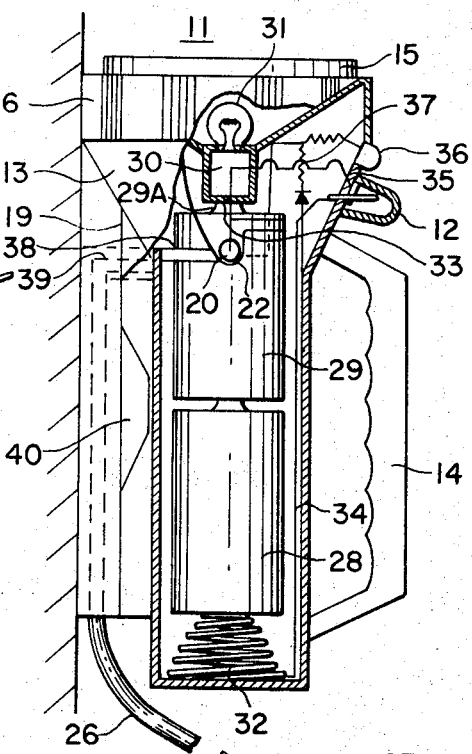
FIG. 2 is a partial cross section of the portable flashlight, the support stand, and the pictorial diagram of the charging circuit contained within the flashlight.

The charging and support means 17 is preferably mounted in the trunk of a motor vehicle or in the glove compartment. The support means has a pair of conductors 25 and 25A in electrical contact with the inner surfaces of slots 22 and 23, respectively. Conductor 25A extends from the supporting and recharging stand 17 to a source of DC current, while conductor 25 extends from the supporting and recharging stand to ground. In the preferred embodiment the source of DC current is the automobile battery, and this source may be obtained in an automobile trunk such as at or near the tail lights of the vehicle or any other convenient place therein. If it is desired to mount the stand in the glove compartment of the vehicle, the conductor 25 may be connected to the ground and 25A to the hot side of the glove compartment switch. As illustrated in FIG. 2, the charging stand may be mounted on any stable wall within the vehicle.

A separate conductor 26 is fitted with means to connect to a source of DC current and may even be fitted with a plug 27 which is adapted to engage the socket of a standard cigarette lighter.

FIG. 2 is a partial cross section of a portable flashlight similar to the one illustrated in FIG. 1 illustrating the charging circuitry and other components of the charging stand and flashlight except seen from a different angle, containing the charging circuitry inside the flashlight, and having somewhat different arrangement for connection to the source of DC voltage. The casing 13 has contained therein rechargeable batteries 28 and 29. Preferably these batteries are size D nickle cadmium rechargeable batteries having 1.25 volts and 1.2 amp hours. Although it is quite apparent that a variety of rechargeable batteries could be utilized in the present invention, the above batteries have been selected for their availability and low cost. The casing 13 preferably defines an enlarged portion 16 which houses a reflector 15, a light socket 30 and a light bulb 31. The light bulb or lamp 31 is intended together with the reflector 15 to generate a beam of light when the flashlight is energized. A coil spring 32 is generally provided at the lower end of casing 13 to urge batteries 28 and 29 upwardly against the lower portion of lamp socket 30. Lamp socket 30 has defined on the bottom thereof a conductor 33 which is in electrical contact with lamp 31.

Mounted on the inner sidewall of casing 13 is a flat electrical conductor 34 which extends upwardly along the inner sidewall of casing 13 to the switch means 12. The other side of switch means 12 is connected directly to the outer portion of lamp socket 30 for engagement with the second connector for lamp 31. Thus when switch 12 is closed, the electrical current generated by batteries 28 and 29 is passed through the coil spring 32, the flat conductor 34, and the switch 12 to the lamp socket 30. The other end of the circuit is completed by the upper portion 29A of the battery 29. Switch 12 is interconnected into the circuitry from its first contact via conductor 35 to socket 30 and from its second contact to conductor 34.

A light emitting diode 36 is mounted in the wall of casing 13 and is designed to provide an indication that the batteries 28 and 29 are being charged. The circuit generally indicated as 37 will be hereinafter later explained.

As was pointed out previously, pins 20 and 21 extend outwardly through the wall of casing 13 and are fixably attached thereto. When the flashlight is positioned within the support stand 17, these pins extend outwardly through slots 22 and 23 to provide both a physical and electrical connection between the support stand and the flashlight. Conductors 38 and 39 extend through the support stand to the rear thereof and downwardly to the charging cable 26.

As was pointed out previously, it may be desirable that the upper portion 19 of the support stand 17 is intimately engaged with the contoured surface of the enlarged portion 16 of casing 13. The pins 20 and 21 are mounted within slots 22 and 23 defined by casing 17. In addition, a resilient means 40 may advantageously be mounted within the casing 17 to urge the flashlight and the connector pins 20 and 21 into a secure engagement with the casing 17. The resilient means 40, if present, acts to force the casing 13 to pivot around pins 20 and 21. Since the interfitting portion of stand 17 is intimately engaged with the casing 13 along the surface 19, the flashlight is not free to rotate and is therefore urged into a resilient and a most secure relationship with the support stand 17. This resilient means 40 is an advantageous, though not essential, extra precaution to provide additional assurance that the flashlight will not be vibrated out of its casing or out of electrical contact during the transit of the motor vehicle.

Since the flashlight may often be used in emergency vehicles such as ambulances and police squad cars, and since these vehicles are subject to unusually severe vibrational stresses, it is important that the flashlight remain in secure engagement with its support stand 17. Accordingly, the use of a resilient means 40 for a flashlight to be used under such conditions may be of considerable advantage. Moreover, under such severe conditions of use, it would be desirable to provide the inner surfaces of slots 22 and 23 with a metallic spring or clip member to more firmly engage and grip the pin members 20 and 21. The spring or clip member would provide a friction type grip to securely clamp the pins 20 and 21.

Figure 3:
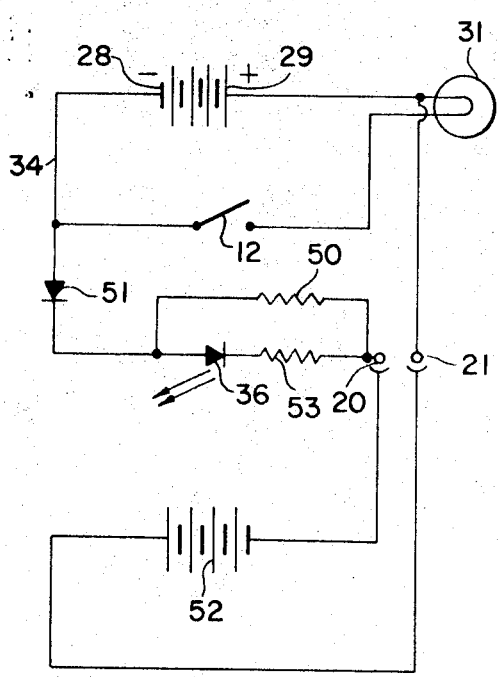
FIG. 3 is a schematic electrical drawing of one embodiment of the charging means utilized in the present invention.
Figure 4:
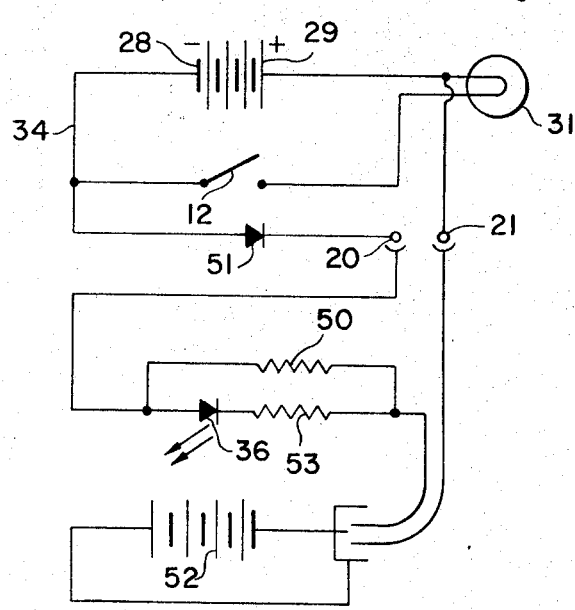
FIG. 4 is a schematic diagram of an alternate embodiment of the charging means used in the present invention.

The charging circuits are illustrated in FIGS. 3 and 4. In the first embodiment illustrated in FIG. 3, the charging circuit is entirely self contained within the flashlight. The batteries 28 and 29 are connected in series with lamp 31 through switch 12. The pins 20 and 21 provide for the input voltage to the recharging circuit.

An impedence means including resistors 50 and 53 and light emitting diode 36 is provided to match the voltage of the primary battery located in the motor vehicle to the batteries 28 and 29 contained in the flashlight. This impedence is variable and is dependent upon the voltage of the car battery and the number of batteries utilized in the flashlight. In the preferred embodiment the resistor 50 is a one watt resistor of approximately 180 ohms. Preferably a safety diode 51 is used to prevent the reverse charging of batteries 28 and 29. Since the Ford Motor Company employs a positive ground in all its motor vehicles and the General Motors Company employs a negative ground on all its vehicles, it is necessary to insure that the polarity of the primary battery and the secondary battery are correctly aligned. The safety diode 51 is designed to prevent the reverse charging of batteries 28 and 29 in the event the flashlight recharging stand is incorrectly installed.

A light emitting diode 36 is installed together with resistor 53 in parallel with resistor 50. The light emitting diode is designed to provide an indication of the flow of current to the secondary batteries 28 and 29. In the event batteries 28 and 29 are being recharged, the light emitting diode will so indicate. The light emitting diode utilizes very little voltage and has excellent longevity. One function of resistor 53 is to provide for the proper current flowing through the light emitting diode. In the preferred embodiment of the invention, the primary battery 52 is also the primary battery for the motor vehicle.

In the embodiment illustrated in FIG. 3 the secondary batteries 28 and 29 are nickle cadmium size D rechargeable batteries having a 1.25 volt rating and capable of discharging 1.2 amp hours. A charging rate is 80-100 milliamps for 16 hours. After the batteries have been fully recharged, the flashlight will operate with a PR-2 type bulb for about 2 hours. This type of bulb draws approximately .5 amps per hour. With a PR-4 type bulb, one may operate the flashlight for approximately 4 hours. If one were to install a flashlight having a different number of secondary batteries or a different voltage for the primary battery 52, the impedence means would necessarily be changed to match the difference in voltage.

An alternate embodiment of the invention is illustrated in FIG. 4. In this embodiment of the invention, the secondary batteries 28 and 29, the lamp 31, the switch 12, and the safety diode 51 are installed in the flashlight. The recharging circuit generally indicated at 37 in FIG. 2 is installed within the cover plate 17A of the support stand 17. A flexible conductor 26 leads outwardly away from the stand 17 and may, for instance, be equipped with a plug 27 which is adapted to engage the receptacle provided for a cigarette lighter in a standard motor vehicle. Again the primary battery 52 is the primary battery for the motor vehicle. The operation of the light emitting diode 36, the resistor 50 and the resistor 53 ramain the same.

In addition, it may be advantageous to include part of the recharging circuit in the flashlight itself and the remainder of the circuit within the support stand 17.

For instance, such an arrangement would be of particular importance when the support stand 17 contains a recharging circuit with an impedence means suited for a flashlight having a certain voltage such as one containing four nickle cadmium size D rechargeable batteries, and it is desired to also use the stand for recharging a flashlight having a lower voltage such as one containing two nickle cadmium size D rechargeable batteries. This could therefore be accomplished by providing the flashlight with the lower voltage, i.e., the one containing the two batteries, with an impedence means so that the combined impedence means present in the stand and the flashlight are such as to match the rechargeable batteries to the voltage provided for recharging. In this manner, a very versatile recharging set up is provided whereby flashlights containing different voltages can be recharged at different times using the same support stand.

Figure 5:
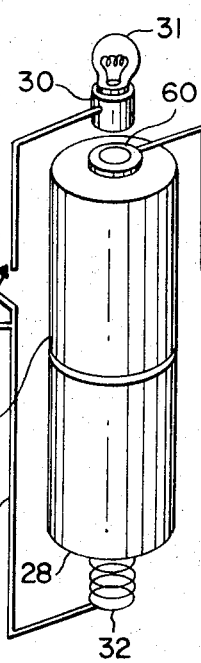
FIG. 5 is a diagrammatic diagram of means which may be employed to provide a flashlight which can be used according to the present invention.

FIG. 5 is an illustration of a means that may be used to provide a flashlight which can be employed according to the present invention. The flashlight contains rechargeable batteries 28 and 29. A metallic ring 60 is fitted over the positive terminal of battery 29 and is adapted to engage not only the positive terminal of battery 29 but also the contact 33 defined on the lower portion of socket 30. A conductor then leads from the ring 60 to pin 21 which has been mounted in the casing of the flashlight. A metallic connector connects the tension spring 32 with the outer portion of the lamp socket 30. The switch 12 is generally arranged in series between the socket and the spring means 32. A diode 51 may be provided between this metallic connector and the pin 20. The pins 20 and 21 are fit into opposite sides of the casing of the flashlight. However, if the casing is metallic, suitable insulation will be required between the pins 20 and 21 and the casing. Accordingly, it is preferred to provide a casing which is a nonconductor of electricity such as any of the conventional synthetic plastics employed in preparing flashlights. Exemplary of suitable synthetic plastics are polyethylenes, polypropylenes and polystyrenes. One advantage of the present invention is the ability to employ a casing which is a non-conductor of electricity without sacrificing the rechargeable and supportable characteristics of the flashlight. After the pins 20 and 21 have been installed, the ring 60 is wired to pin 21, and a diode connection may be made between pin 20 and the electrical strap means 34 connecting the negative side of battery 28 with the negative side of lamp socket 30.

Having described above the preferred embodiment of our invention, we wish it to be understood that we do not desire to be limited thereto, but that the scope of the invention be limited only to the extent required by the prior art and as defined in the appended claims.

What is claimed is:

1. A portable flashlight having at least one rechargeable battery and a support stand for attachment to a motor vehicle comprising:

a. a portable flashlight having a casing, said casing containing at least one rechargeable battery, a lamp socket and lamp means for providing light, reflector means, and switch means for connecting said lamp and said socket to said battery, said casing having a first pair of contact electrodes mounted on the exterior thereof, said electrodes protruding outwardly on opposite sides of said casing and rigidly attached thereto;

b. a support stand adapted for mounting on a stable wall means, said stand providing a second pair of contact electrodes for supporting said flashlight and engaging said first pair of contact electrodes;

c. means for providing a source of DC voltage to said second pair of contact electrodes; and d. charging means for charging said at least one rechargeable battery, said charging means matching said rechargeable battery to said DC voltage provided for recharging; and comprising a first impedence means, a second impedence means connected in parallel to said first impedence means, and a light emitting diode; said light emitting diode being adapted to indicate that said rechargeable battery is being recharged.

2. The flashlight and stand of claim 1 wherein said first pair of contact electrodes protrude substantially horizontally outward on opposite sides of said casing and said second pair of contact electrodes being generally U-shaped.

3. The portable flashlight and stand of claim 1 wherein said impedence means is contained partially within said stand and partially within said flashlight.

4. The flashlight and stand of claim 1 wherein said charging means is wholly contained within said flashlight casing.

5. The flashlight and stand of claim 1 wherein said charging means is contained within said support stand.

6. The flashlight and stand of claim 1 wherein said charging means further comprises a diode to protect said at least one rechargeable battery from reverse charging.

7. The flashlight and stand of claim 1 wherein said casing is a non-conductor of electricity.

8. The flashlight and stand of claim 7 wherein substantially the entire support stand except for said second pair of contact electrodes is a non-conductor of electricity.

9. The portable flashlight and stand of claim 1 wherein said casing has an enlarged portion surrounding said reflector means and wherein said stand is configured to intimately engage the enlarged portion of said flashlight casing surrounding said reflector.

10. The flashlight and stand of claim 1 wherein said stand provides a spring means for urging said flashlight into engagement with said second contact electrodes.

* * * * *